US012001432B1

(12) United States Patent
Burger et al.

(10) Patent No.: US 12,001,432 B1
(45) Date of Patent: Jun. 4, 2024

(54) REDUCING QUERY OPTIMIZER PLAN REGRESSIONS WITH MACHINE LEARNING CLASSIFICATION

(71) Applicant: Teradata US, Inc, San Diego, CA (US)

(72) Inventors: Louis Martin Burger, Escondido, CA (US); Chrisopher James Antoun, Santa Clara, CA (US); Matthew Edward Antoun, Santa Clara, CA (US); Frank Roderic Vandervort, Ramona, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/903,626

(22) Filed: Sep. 6, 2022

(51) Int. Cl.
*G06F 16/2453* (2019.01)
*G06N 5/022* (2023.01)

(52) U.S. Cl.
CPC ....... *G06F 16/24545* (2019.01); *G06N 5/022* (2013.01)

(58) Field of Classification Search
CPC .......................... G06F 16/24545; G06N 5/022
See application file for complete search history.

(56) References Cited

U.S. PATENT DOCUMENTS

| 5,794,250 | A | * | 8/1998 | Carino, Jr. | ............ | G06F 16/284 |
| | | | | | | 707/999.009 |
| 7,127,456 | B1 | | 11/2006 | Brown et al. | | |
| 7,831,593 | B2 | | 11/2010 | Burger et al. | | |
| 8,280,867 | B2 | | 10/2012 | Brown et al. | | |
| 9,244,838 | B2 | | 1/2016 | Lopes et al. | | |
| 11,182,360 | B2 | * | 11/2021 | Das | ........................ | G06F 16/217 |
| 2012/0203762 | A1 | * | 8/2012 | Kakarlamudi | .... | G06F 16/24542 |
| | | | | | | 707/718 |
| 2017/0147639 | A1 | * | 5/2017 | Lee | .................. | G06F 16/24539 |
| 2021/0117422 | A1 | | 4/2021 | Cabrera et al. | | |
| 2022/0414099 | A1 | * | 12/2022 | Dutt | .................. | G06F 16/24542 |

OTHER PUBLICATIONS

Teradata Vantage Advanced SQL Engine. https://www.teradata.com/Products/Software/Database.
Viktor Leis et al., "How good are query optimizers, really?", Proc. VLDB Endow., 2015.
"Monitor performance by using the Query Store", Microsoft SQL Server 2019 User Documentation. https://docs.microsoft.com/en-us/sql/relational-databases/performance/monitoring-performance-by-using-the-query-store.
"Teradata Vantage SQL Request and Transaction Processing", Teradata documentation # B035-1142-162K. docs.teradata.com.

(Continued)

*Primary Examiner* — Kuen S Lu
(74) *Attorney, Agent, or Firm* — Howard Speight

(57) ABSTRACT

A database system receives a query. The database system retrieves an old query execution plan (QEP), OldPlan, for the query. The database system submits the query to an optimizer. The optimizer returns a new QEP, NewPlan, for the query. The database system submits the OldPlan and the NewPlan to a machine learning classifier (ML classifier). The ML classifier predicts that executing the NewPlan will result in a performance regression as compared to executing the OldPlan. The database system executes the OldPlan instead of the NewPlan.

20 Claims, 9 Drawing Sheets

(56) References Cited

OTHER PUBLICATIONS

Wentao Wu et al., "Predicting Query Execution Time: Are Optimizer Cost Models Really Unusable?", In ICDE. IEEE Computer Society, Washington, DC, USA, 1081-1092. https://doi.org/10.1109/ICDE.2013.6544899.
Bailu Ding et al., "Ai meets ai: Leveraging query executions to improve index recommendations." In Proceedings of the 2019 International Conference on Management of Data, pp. 1241-1258, 2019.
Peter W. Battaglia et al., "Relational inductive biases, deep learning, and graph networks," arXiv preprint arXiv:1806.01261, 2018.
Overview of SQL Plan Management. Oracle Release 12.2 User Documentation. https://docs.oracle.com/en/database/oracle/oracle-database/12.2/tgsql/overview-of-sql-plan-management.html.
Jennifer Ortiz et al., "An Empirical Analysis of Deep Learning for Cardinality Estimation." CoRR abs/1905.06425 (2019).
Ryan Marcus et al., "Neo: A Learned Query Optimizer." Proceedings of the VLDB Endowment Jul. 2019. arXiv:1904.03711.
Haijun Zhang et al., "Tree2Vector: Learning a Vectorial Representation for Tree-Structured Data." IEEE Transactions on Neural Networks and Learning Systems, vol. 29, No. 11, pp. 5304-5318, Nov. 2018.
Feng Xia, et al., "Graph Learning: A Survey." IEEE Transactions on Artificial Intelligence, vol. 00, No. 0, 2021. arXiv:2105.00696 (2021).
Paulo Silva et al. Privacy in the Cloud: A Survey of Existing Solutions and Research Challenges. IEEE Access. pp. 1-1. 10.1109/ACCESS.2021.3049599. (2021).
Thomas N. Kipf et al. "Variational Graph Auto-Encoders." arXiv preprint arXiv:1611.07308 (2016).

\* cited by examiner

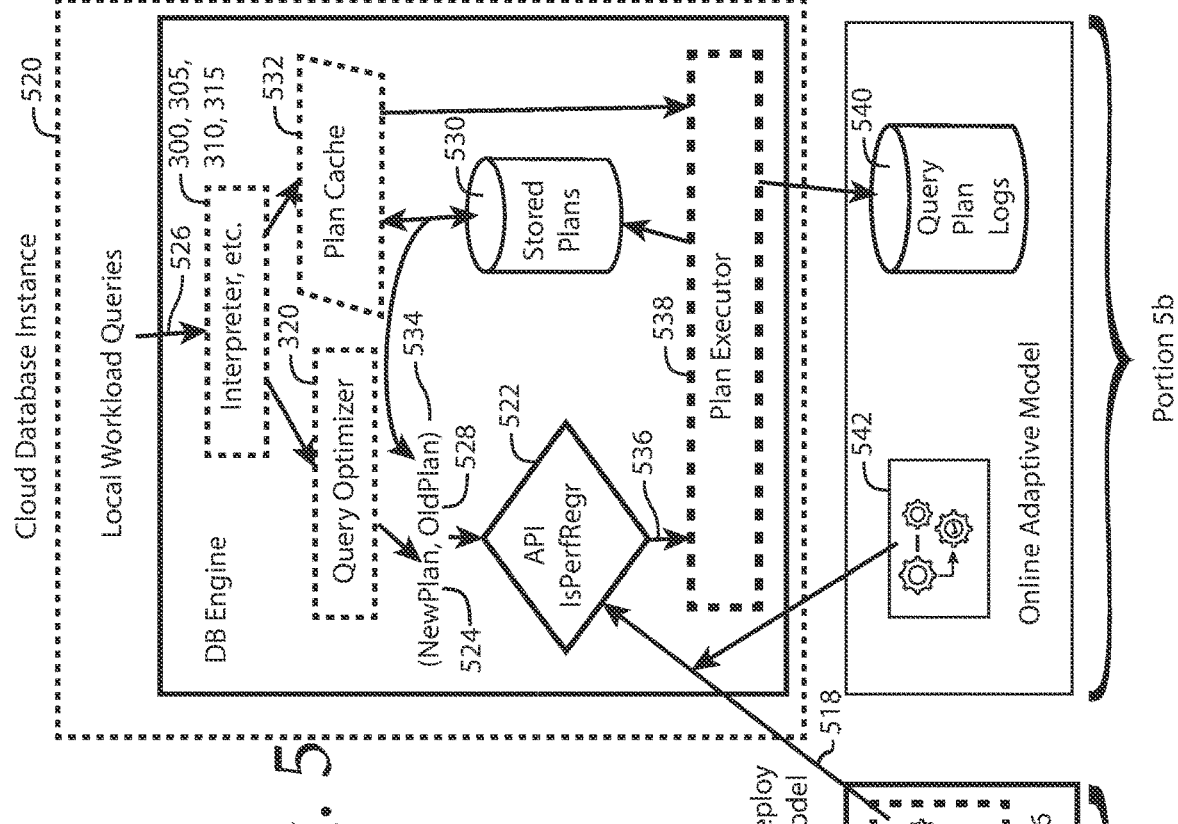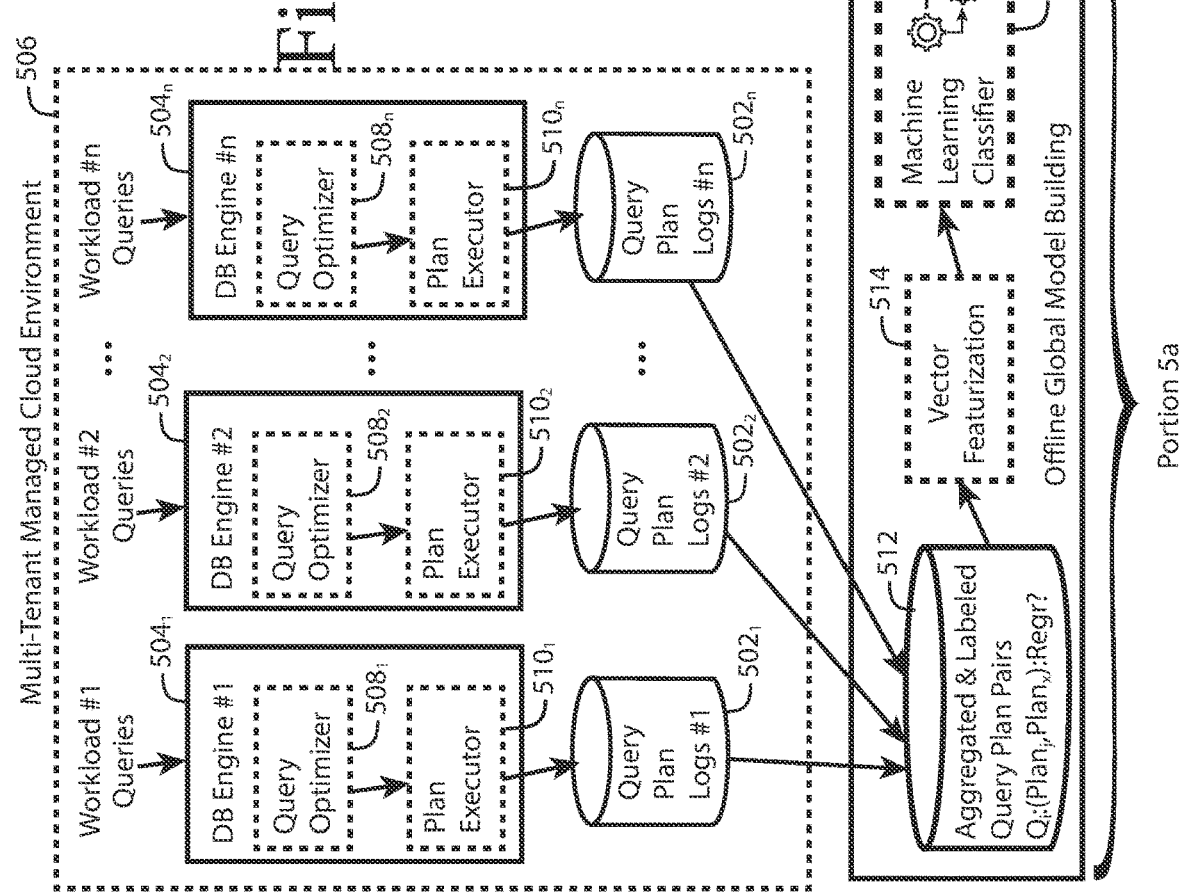
Fig. 5

| Orchards for Query 1 | Orchards for Query 2 | Orchards for Query N |
|---|---|---|
| ($Q_1$, $P_{1a}$, $HC_{11}$, $VL_{11}$, Costs) 602<br>($Q_1$, $P_{1b}$, $HC_{11}$, $VL_{11}$, Costs)<br>($Q_1$, $P_{1c}$, $HC_{11}$, $VL_{11}$, Costs) | ($Q_2$, $P_{2a}$, $HC_{21}$, $VL_{21}$, Costs) 608<br>($Q_2$, $P_{2b}$, $HC_{21}$, $VL_{21}$, Costs)<br>($Q_2$, $P_{2c}$, $HC_{21}$, $VL_{21}$, Costs) | ($Q_N$, $P_{Na}$, $HC_{N1}$, $VL_{N1}$, Costs) 614<br>($Q_N$, $P_{Nb}$, $HC_{N1}$, $VL_{N1}$, Costs)<br>($Q_N$, $P_{Nc}$, $HC_{N1}$, $VL_{N1}$, Costs) |
| ($Q_1$, $P_{1d}$, $HC_{12}$, $VL_{12}$, Costs) 604<br>($Q_1$, $P_{1e}$, $HC_{12}$, $VL_{12}$, Costs)<br>($Q_1$, $P_{1f}$, $HC_{12}$, $VL_{12}$, Costs) | ($Q_2$, $P_{2d}$, $HC_{22}$, $VL_{21}$, Costs) 610<br>($Q_2$, $P_{2e}$, $HC_{22}$, $VL_{21}$, Costs)<br>($Q_2$, $P_{2f}$, $HC_{22}$, $VL_{21}$, Costs) | ($Q_N$, $P_{Nd}$, $HC_{N2}$, $VL_{N1}$, Costs) 616<br>($Q_N$, $P_{Ne}$, $HC_{N2}$, $VL_{N1}$, Costs)<br>($Q_N$, $P_{Nf}$, $HC_{N2}$, $VL_{N1}$, Costs) |
| ($Q_1$, $P_{1g}$, $HC_{12}$, $VL_{12}$, Costs) 606<br>($Q_1$, $P_{1h}$, $HC_{12}$, $VL_{12}$, Costs)<br>($Q_1$, $P_{1i}$, $HC_{12}$, $VL_{12}$, Costs) | ($Q_2$, $P_{2g}$, $HC_{22}$, $VL_{22}$, Costs) 612<br>($Q_2$, $P_{2h}$, $HC_{22}$, $VL_{22}$, Costs)<br>($Q_2$, $P_{2i}$, $HC_{22}$, $VL_{22}$, Costs) | ($Q_N$, $P_{Ng}$, $HC_{N2}$, $VL_{N2}$, Costs) 618<br>($Q_N$, $P_{Nh}$, $HC_{N2}$, $VL_{N2}$, Costs)<br>($Q_N$, $P_{Ni}$, $HC_{N2}$, $VL_{N2}$, Costs) |

$Q_i$ denotes a Query, $P_j$ denotes a plan, $HC_j$ denotes a hardware configuration, $VL_j$ denotes a data volume level

Fig. 6

Assume a pair of plans (p1,p2) within a given *Orchard* along with the following weighting factors that normalize different categories of resources consumed into a common cost unit such as milliseconds.

$w\_io$ is a configurable weight representing the cost of a logical I/O in a common unit
$w\_cpu$ is a configurable weight representing the cost of a CPU tick in a common unit
$w\_memory$ is a configuable weight representing the cost of using a KB of memory in a common unit Plan costs:
  $p1\_cost = w\_io * p1\_total\_Logical\_ios + w\_cpu * \#p1\_total\_CPU\_ticks + w\_memory * \#KB\ memory$
  $p2\_cost = w\_io * p2\_total\_Logical\_ios + w\_cpu * \#p2\_total\_CPU\_ticks + w\_memory * \#KB\ memory$ Subtract lower cost from higher cost:

if ( p1_cost > p2_cost)
    pHigh = p1;  pLow = p2; pHigh_cost = p1_cost; pLow_cost = p2_cost;
else if ( p2_cost > p1_cost)
    pHigh = p2;  pLow = p1; pHigh_cost = p2_cost; pLow_cost = p1_cost;
else
    Label (p1,p2) as "No regression"

Label as regression if higher cost is > 10% of lower cost
OR if the lower cost plan met its SLA whereas the higher cost plan did not:

if ( ((pHigh_cost – pLow_cost) / pLow_cost) > threshold% )  // default threshold% is 10
    Label (pLow,pHigh) as "Yes regression"
else
    Label (pLow,pHigh) as "No regression"

Fig. 7

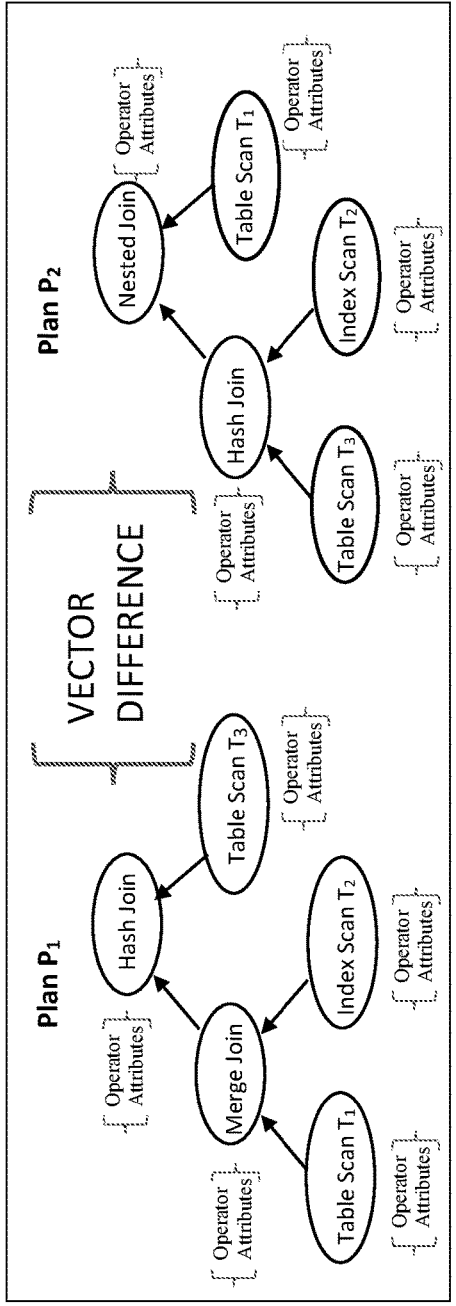

Fig. 8

| Feature property | Description |
|---|---|
| Step type | Physical Operator such as table scan, merge join, etc. |
| Parallelism Level | Number of processors participating in execution |
| CPU ticks | CPU usage incurred by this step |
| Logical I/Os | number of logical I/Os performed by step |
| Physical I/Os | number of physical I/Os performed by the step |
| Output Rows | number of rows output by this step |
| Output Size in bytes | size of output spool in bytes |
| Optimizer Confidence | Optimizer's confidence level (e.g., stats availability) for its estimates |
| Optimizer Version | Software Version of Query Optimizer that generated the plan |
| Left input | reference to $1^{st}$ input step or table |
| Right input | reference to $2^{nd}$ input step or table |

Fig. 9

```
NewPlan ← Current plan generated from most recent call to Query Optimizer
OldPlan ← Prior plan fetched from cache or storage for same query If (OldPlan does not exist)
{
    Execute NewPlan
    Add NewPlan to Plan Cache
}
Else if (OldPlan same as NewPlan)
{
    Execute OldPlan
}
Else if (NewPlan.HardwareConfig <> OldPlan.HardwareConfig OR NewPlan.VolumeLevel <> OldPlan.VolumeLevel)
{
    /* NewPlan becomes the new baseline plan for the "Orchard" that is now in effect */
    Execute NewPlan
    Add NewPlan to Plan Cache
}
Else if ( IsPlanRegression(NewPlan, OldPlan) == true )   // use classifier model to predict
{
    /* stick with the old plan */
    Execute OldPlan
    Record regression avoidance event for NewPlan within database event log
}
Else
{
    Execute NewPlan
    Add NewPlan to Plan Cache
}
```

Fig. 10

REDUCING QUERY OPTIMIZER PLAN REGRESSIONS WITH MACHINE LEARNING CLASSIFICATION

BACKGROUND (Note: This application references a number of different publications as indicated throughout the specification by one or more reference numbers within brackets [x]. A list of these publications ordered according to these reference numbers can be found below in the section entitled "References." The Reference section may also list some publications that are not explicitly referenced in this application. Each of these publications, including those that are not explicitly referenced, is incorporated by reference herein.)

Automatic cost-based query optimization is one of the bedrocks of modern database systems as it relieves users of the enormous burden of having to manually tune their queries. There are inherent limits in the technology such that even the most robust query optimizers make mistakes in cardinality estimation or fail to simulate all runtime conditions in their cost models [2]. In addition, many customers implement production workloads with strict service level goals and execute them on systems running near capacity and the combination leaves little margin of error.

While database systems routinely cache plans for frequently executed queries to avoid parsing overhead, and in some cases persistently store them, it is not feasible to reuse the same plans for extended periods of time. They will eventually become sub-optimal due to changes in underlying data demographics or invalid due to changes in the physical configuration (e.g., dropped indexes). Hence, query optimizers must periodically re-optimize the queries in a production workload, which exposes them to the risk of performance regression. In the context of this document, the term "regression" is used to denote a reduction in performance (e.g., an increase in cost). This is to be distinguished from "machine learning regression," which denotes predicting a quantity (e.g., query cost). Also, in the context of this document, the phrase "machine learning classification," denotes predicting a label or category (e.g., "yes" or "no").

One common scenario that often leads to regressions is the release of a new software version of the query optimizer that does in fact improve the overall performance of a workload but in the process of doing so slows down a handful of queries. Those queries for which performance slows suffer regression.

Customers want the best of both worlds, but if they had to choose, many would prefer a solution that results in no individual query regressions over one that maximizes overall workload performance. It is a challenge to achieve this result as the accuracy of traditional query optimizer technology is nearing its potential limit.

SUMMARY

In one aspect, a method includes a database system receiving a query. The database system retrieves an old query execution plan (QEP), OldPlan, for the query. The database system submits the query to an optimizer. The optimizer returns a new QEP, NewPlan, for the query. The database system submits the OldPlan and the NewPlan to a machine learning classifier (ML classifier). The ML classifier predicts that executing the NewPlan will result in a performance regression as compared to executing the OldPlan. The database system executes the OldPlan instead of the NewPlan.

Implementations may include one or more of the following The method may include training the ML classifier by determining costs of historical QEPs for the query using logged resource usage metrics not impacted by extraneous system activities and comparing the determined costs of a pair of historical QEPs for the query and labeling a one of the pair as a regression if the determined cost of the one of the pair of historical QEPs exceeds the determined cost of the other of the pair of historical QEPs by a threshold percentage. The pair of historical QEPs may be selected from an orchard of QEPs for the query wherein the orchard contains QEPs developed for the query for hardware configurations having the same complement of hardware processors and data storage facilities and for data volume levels within a threshold amount of each other. The method may further include the database system determining that, because of a recent change in hardware configuration or data storage facilities the NewPlan is in a different orchard than the OldPlan, and, as a result, not performing any of the elements of the method except the database system receiving the query, the database submitting the query to the optimizer, and the optimizer returning the new QEP, NewPlan, for the query, and the method further including the database system executing the NewPlan and the database system including the NewPlan and statistics from executing the NewPlan in the logged resource usage metrics being used to train the ML classifier. The method may include the database system determining that the query is being run in a training mode, a retraining mode, or that a query plan exists for the query in a cache or a cache-like persistent storage, and, as a result, not performing any of the elements of claim 1 except the database system receiving the query, the database submitting the query to the optimizer, and the optimizer returning the new QEP, NewPlan, for the query, and the method further including the database system executing the NewPlan and the database system including the NewPlan and statistics from executing the NewPlan in the logged resource usage metrics being used to train the ML classifier. The database system may determine that the query is being run in a retraining mode by the query being designated with a retraining query band. The database system may determine that the cache or cache-like persistent storage has become invalid dues to changes in a hardware configuration for the database system maintaining the cache or cache-like persistent storage, and, as a result, the database system may spoil the cache or cache-like persistent storage. The method may include replacing the OldPlan in a memory store with the NewPlan. The database system may retrieve the OldPlan from a cache. The method may include notifying the optimizer that the NewPlan has been rejected. The ML classifier may be encapsulated as an application programming interface (API) that can be called by the database system.

In one aspect, a non-transitory computer-readable tangible medium, on which is recorded a computer program that features executable instructions, that, when executed, perform a method that includes a database system receiving a query. The database system retrieves an old query execution plan (QEP), OldPlan, for the query. The database system submits the query to an optimizer. The optimizer returns a new QEP, NewPlan, for the query. The database system submits the OldPlan and the NewPlan to a machine learning classifier (ML classifier). The ML classifier predicts that executing the NewPlan will result in a performance regression as compared to executing the OldPlan. The database system executes the OldPlan instead of the NewPlan.

Implementations may include one or more of the following. The method may include training the ML classifier by determining costs of historical QEPs for the query using logged resource usage metrics not impacted by extraneous system activities and comparing the determined costs of a pair of historical QEPs for the query and labeling a one of the pair as a regression if the determined cost of the one of the pair of historical QEPs exceeds the determined cost of the other of the pair of historical QEPs by a threshold percentage. The pair of historical QEPs may be selected from an orchard of QEPs for the query wherein the orchard contains QEPs developed for the query for hardware configurations having the same complement of hardware processors and data storage facilities and for data volume levels within a threshold amount of each other. The method may include the database system determining that, because of a recent change in hardware configuration or data storage facilities the NewPlan is in a different orchard than the OldPlan, and, as a result, not performing any of the elements of the method except the database system receiving the query, the database submitting the query to the optimizer, and the optimizer returning the new QEP, NewPlan, for the query, the method including the database system executing the NewPlan and the database system including the NewPlan and statistics from executing the NewPlan in the logged resource usage metrics being used to train the ML classifier. The method may include the database system determining that the query is being run in a training mode, a retraining mode, or that a query plan exists for the query in a cache or a cache-like persistent storage, and, as a result, not performing any of the elements of the method except the database system receiving the query, the database submitting the query to the optimizer, and the optimizer returning the new QEP, NewPlan, for the query, and the method further including the database system executing the NewPlan and the database system including the NewPlan and statistics from executing the NewPlan in the logged resource usage metrics being used to train the ML classifier. The database system may determine that the query is being run in a retraining mode by the query being designated with a retraining query band. The method may include the database system determining that the cache or cache-like persistent storage has become invalid dues to changes in a hardware configuration for the database system maintaining the cache or cache-like persistent storage, and as a result, the database system may spoil the cache or cache-like persistent storage. The method may include notifying the optimizer that the NewPlan has been rejected. The ML classifier may be encapsulated as an application programming interface (API) that can be called by the database system.

BRIEF DESCRIPTION OF THE DRAWINGS

FIG. 5 illustrates the general architecture of a system to employ the technique.

FIG. 6 illustrates query plans organized into "orchards."

FIG. 7 summarizes an example of predicting regression between a pair of plans with pseudo-code written in a C-language style syntax.

FIG. 8 illustrates featurizing a pair of plans.

FIG. 9 summarizes the step level attributes that are considered when building the model.

FIG. 10 summarizes using the classifier to select between an old plan and a new plan with pseudo-code written in a C-language style syntax.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
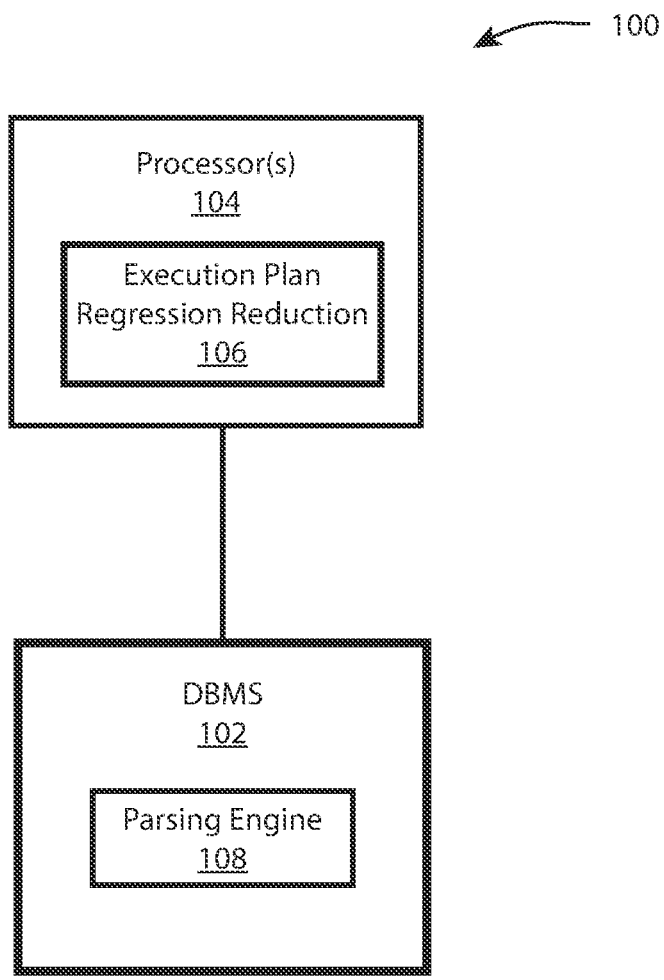
FIG. 1 is one example of a block diagram of a computer system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), and Microsoft (Azure). The software components are programmed as executable instructions into memory and/or a non-transitory computer-readable medium for execution on the hardware components (including, for example, hardware processors). The system 100 includes one or more network connections; the networks can be wired, wireless, or a combination of wired and wireless.

The system 100 implements, among other things, the processing described below in connection with FIGS. 1-11.

An Example Database Management System

The system 100 includes a Database Management System (DBMS) 102, at least one hardware processor 104, and a non-transitory computer-readable storage medium having executable instructions representing an execution plan regression reduction technique as disclosed herein 106. The DBMS 102 may be a relational DBMS (RDBMS) or it may be another variety of database management system.

The DBMS 102 may include a parsing engine 108, discussed below in connection with FIGS. 2 and 3, that organizes the storage of data and the distribution of database table rows and coordinates the retrieval of data from the data-storage facilities in response to queries received from a user. The DBMS 100 usually receives queries and commands to build tables in a standard format, such as Structured Query Language (SQL).

Figure 2:
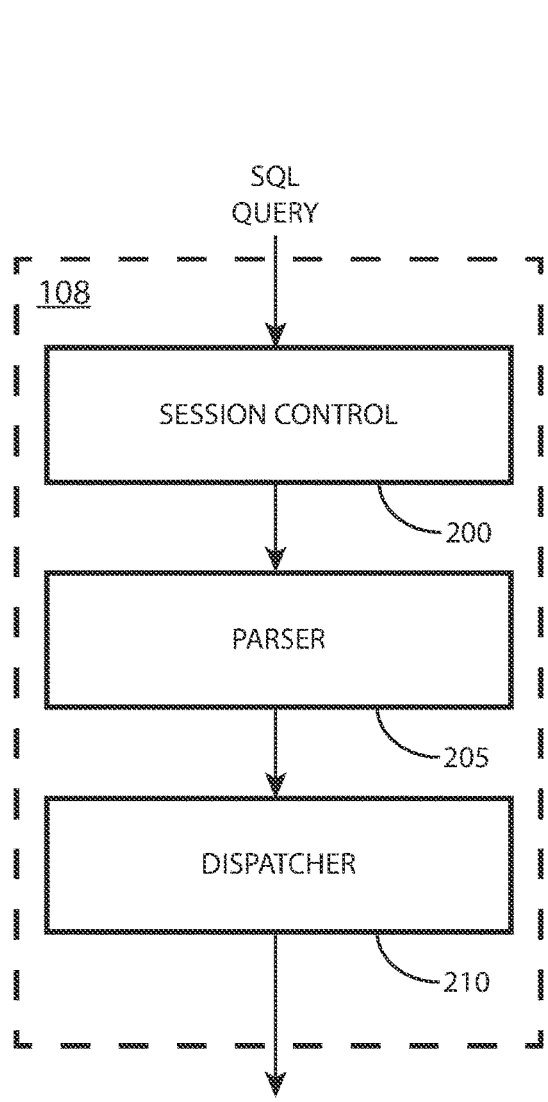
FIG. 2 is one example of a block diagram of a parsing engine.
Figure 3:
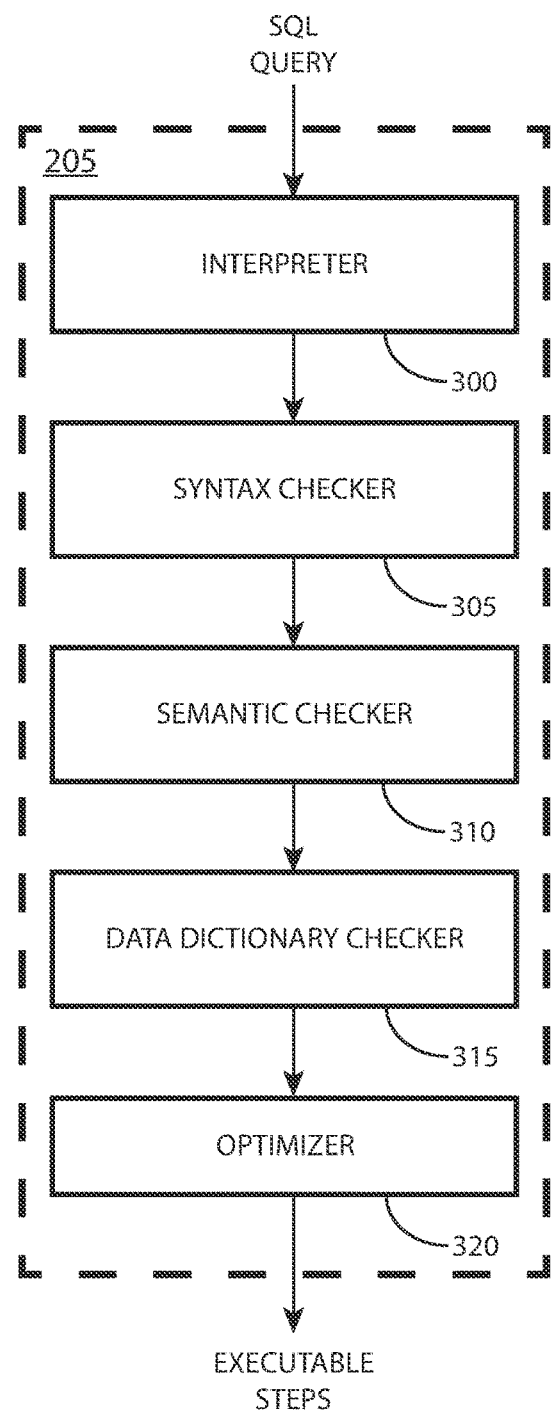
FIG. 3 is one example of a block diagram of a parser.

Once the session control 200, shown in FIG. 2, allows a session to begin, a user may submit a SQL query. More broadly, the user may submit a "request," a term that includes database queries, which are processed by the DBMS to produce an output result, and other DBMS actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces executable steps to execute the QEP. A dispatcher 210 issues commands to implement the executable steps.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

Techniques to Improve the Performance Stability of Frequently Executed Queries

The performance stability of frequently executed queries, i.e., queries that are executed, for example, as a routine and recurring part of the business of an enterprise, may have a substantial effect on enterprise production workloads. Unanticipated regressions in such queries can wreak havoc on overall system performance and service level goals for individual queries. Such regressions are not uncommon, even with mature industry query optimizers including Teradata's SQL Engine [1]. The techniques described herein provide additional guard rails in the form of a post-optimization quality check whereby the plan from the current call to the optimizer 320 is compared with the one chosen during the prior call, assuming one exists and they differ. This quality check is in the form of a machine learning ("ML") classifier that was trained on historical query logs grouped into pairs of alternative plans for distinct queries.

Figure 4:
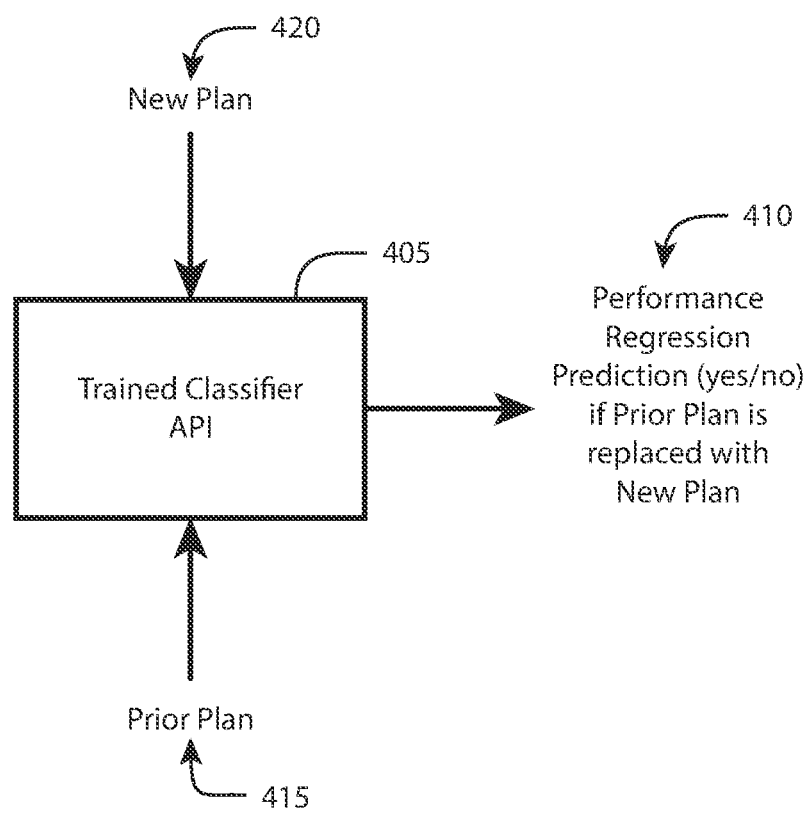
FIG. 4 illustrates a classifier being used as a machine learning quality check.

FIG. 4 illustrates a classifier being used as a machine learning quality check. The trained classifier is deployed in the form of an application programming interface ("API") 405 that predicts whether a performance regression 410 would occur if the prior plan 415 is replaced with a specified new plan 420. The API is configured to be callable in the context of the DBMS 102 but also in the context of any other database system in which the classifier would be useful. The resulting classifier is often more accurate than a static cost model that is often employed by the optimizer 320 and which is not fully capable of learning and adapting from observed performance results. In addition, the classifier 405 may be more accurate than regression-based ML models that attempt to predict actual query plan costs because the classifier focuses on minimizing comparison errors, i.e., errors in predicting performance regression. The techniques described herein retain the advantages of proven cost-based query optimizer technology and its ability to react to changes in data demographics and physical tuning while adding an additional ML-based safeguard to reduce the likelihood of regressions.

FIG. 5 illustrates the general architecture of a system to employ the technique. Portion 5a of FIG. 5 depicts telemetry data in the form of logged optimizer query plans being collected from query plan logs $502_1$, $502_2$, $502_n$ and aggregated from multiple customer systems $504_1$, $504_2$, $504_n$ within a cloud database service environment (multi-tenancy) 506, each of which reflects a variety of query workload characteristics. The customer systems $504_1$, $504_2$, $504_n$ include optimizers $508_1$, $508_2$, $508_n$ similar to or the same as optimizer 320 and plan executors $510_1$, $510_2$, $510_n$ similar to or the same as the dispatcher 210 described above in connection with FIGS. 2 and 3. A pre-processor 512 identifies distinct queries by, for example, hashing on the SQL text or parsed syntax tree. The pre-processor 512 identifies distinct query plans by, for example, hashing on the EXPLAIN [6] text or internal query plan structure produced by the optimizer 320. Queries and their associated plans are grouped into pairs of alternative plans generated over time as the optimizer 320 reacts to changes in data demographics or applies new execution strategies or costing formulas shipped with updated versions of the database system software.

For machine learning, query plans are featurized 514 into a vector that encodes the graph structure of their operator trees along with a subset of operator level attributes whose change over time is a potential cause of performance regressions. Each (OldPlan, NewPlan) pair in the training data is assigned a binary label indicating whether the new plan was a regression of the old plan based on the logged actual performance of each plan using resource metrics such as logical I/O and CPU that do not vary by system load or concurrency. Supervised learning is then performed on the labeled data by a machine learning classifier 516 employing standard learning methods for classification. That is, the ML classifier adjusts the parameters it uses to classify pairs of input plans as regressions in response to actual data provided during training. Further, as more queries execute (with or without plan regressions) and get logged the classifier is retrained to encompass that new "feedback" data, as discussed below.

Portion 5b of FIG. 5 illustrates the deployment 518 of the trained offline model 516 back onto a cloud database instance 520 in the form of API IsPerfRegr(NewPlan, OldPlan) 522 that predicts whether a performance regression would occur if OldPlan were replaced with NewPlan. The standard interpreter 300, syntax checker 305, semantic checker 310, data dictionary checker 315, and optimizer 320 and its cost model identify the best plan (the "NewPlan") 524 for the submitted query 526. An OldPlan 528 for the submitted query 526 is retrieved from storage 530 (perhaps persistent) or perhaps from a cache 532, as discussed below, and the (NewPlan, OldPlan) pair 534 is submitted to the API 522. The API 522 performs a post-optimizer quality check to produce a prediction 536 as to whether executing the NewPlan will result in a performance regression over execution of the OldPlan. If the API 522 predicts a regression, a plan executor 538 (similar to or the same as the dispatcher 210 discussed in connection with FIG. 2) will execute the OldPlan. If the API does not predict a regression the plan executor will execute the NewPlan and replace the OldPlan with the NewPlan in the store 530 or the cache 532.

The technique is based on the premise that a ML classifier that focuses on minimizing errors in predicting performance regressions when transitioning from an old plan to a new plan is better suited to the problem at hand (i.e., avoiding performance regressions). This contrasts with a solution based on learning a regression model that attempts to improve the cost estimates of individual plans and then in turn using those costs to compare new vs. old.

Details of the technique are organized into the following sub-topics and presented in the sections that follow:

(a) methods for pre-processing and labeling historical training data;

(b) methods for "featurizing" query plans into a suitable learning representation;
(c) methods for performing supervised offline learning of a binary classifier;
(d) methods for persistently storing plans to retain a prior plan when necessary;
(e) methods for deploying the model as an API that predicts Optimizer plan regressions; and
(f) methods for further adapting a deployed offline model to a local workload.

Preprocessing Training Data to Promote Meaningful Comparisons

The training data consists of historical query logs [5], e.g., query plan logs $502_1, 502_2, \ldots, 502_n$, covering a sufficient period of time such that the optimizers $508_1, 508_2, \ldots, 508_n$ for the various customer systems $504_1, 504_2, \ldots, 504_n$ have chosen alternative plans for a variety of representative queries within a workload. In preparation for forming pairs of alternative plans and labeling them as to whether the newer version is a performance regression, the technique will determine that certain pairs cannot be reasonably compared due to significant differences in their execution environments. In particular, it may not be feasible or prudent to compare the performance of two plans that execute against significantly different volumes of data or those that execute on platforms with very different hardware characteristics. For example, a given query executed against a certain volume of data that is subsequently executed on twice that volume on the same machine will almost certainly run slower. Similarly, if a system is re-provisioned with fewer (or slower) processors or disks than before, queries will typically run slower.

While it is true that that the end user's experience with such queries may be negatively impacted, such performance regressions are not likely the result of a mistake in the optimizer's plan selection and hence are not relevant for the purpose of training the ML classifier 516. When past queries are re-run in dramatically changed environments, the baseline for the optimizer and its chosen plans must be reestablished before it is possible to resume the identification of regressions. To account for this, the pre-processor 512 will filter such pairs from being considered by the offline learning model 516 and its deployed prediction API 522. In turn, this allows the technique to retain a simple binary (yes, no) classifier and not resort to a ternary (yes, no, unknown) or (yes, no, n/a).

Using the familiar "apples-to-apples" phrase and analogy, the technique sorts plans consisting of the same type of "fruit" into what the technique designates as an "orchard". FIG. 6 illustrates query plans organized into "orchards." As depicted in FIG. 6, the preprocessing logic starts by forming groups of alternative plans for each distinct combination of query, hardware profile, and relative data volume. As can be seen in the example shown in FIG. 6, each of N queries has an associated set of orchards. The query plans for Query 3 through Query N−1 are represented by an ellipsis on FIG. 6.

The query plans for Query 1 are grouped into 3 orchards.
The first orchard 602 includes query plans $P_{1a}, P_{1b}$, and $P_{1c}$ and has hardware configuration $HC_{11}$ and data volume level $VL_{11}$.
The second orchard 604 includes query plans $P_{1d}, P_{1e}$, and $P_{1f}$ and has hardware configuration $HC_{12}$ (which is different from the hardware configuration $HC_{11}$ for the first orchard 602) and data volume level $VL_{11}$.
The third orchard 606 includes query plans $P_{1g}, P_{1h}$, and $P_{1i}$ and has hardware configuration $HC_{12}$ (which is different from the hardware configuration $HC_{11}$ for the first orchard 602 but the same as the hardware configuration $HC_{12}$ for the second orchard 604) and data volume level $VL_{12}$ (which is different from the data volume level $VL_{11}$ for the first orchard 602 and the second orchard 604).

The query plans for Query 2 are grouped into 3 orchards.
The first orchard 608 includes query plans $P_{2a}, P_{2b}$, and $P_{2c}$ and has hardware configuration $HC_{21}$ and data volume level $VL_{21}$.
The second orchard 610 includes query plans $P_{2d}, P_{2e}$, and $P_{2f}$ and has hardware configuration $HC_{22}$ (which is different from the hardware configuration $HC_{21}$ for the first orchard 608) and data volume level $VL_{21}$.
The third orchard 612 includes query plans $P_{2g}, P_{2h}$, and $P_{2i}$ and has hardware configuration $HC_{22}$ (which is different from the hardware configuration $HC_{21}$ for the first orchard 608 but the same as the hardware configuration $HC_{22}$ for the second orchard 604) and data volume level $VL_2$ (which is different from the data volume level $VL_{21}$ for the first orchard 608 and the second orchard 610).

The query plans for Queries 3 through N−1 are grouped into orchards (represented by the ellipsis) that are not shown in FIG. 6 but are similar to those groupings shown in FIG. 6.

The query plans for Query N are grouped into 3 orchards.
The first orchard 614 includes query plans $P_{Na}, P_{Nb}$, and $P_{Nc}$ and has hardware configuration $HC_{N1}$ and data volume level $VL_{N1}$.
The second orchard 616 includes query plans $P_{Nd}, P_{Ne}$, and $P_{Nf}$ and has hardware configuration $HC_{N2}$ (which is different from the hardware configuration $HC_{N1}$ for the first orchard 614) and data volume level $VL_{N1}$.
The third orchard 618 includes query plans $P_{Ng}, P_{Nh}$, and $P_{Ni}$ and has hardware configuration $HC_{N2}$ (which is different from the hardware configuration $HC_{N1}$ for the first orchard 614 but the same as the hardware configuration $HC_{N2}$ for the second orchard 604) and data volume level $VL_{N2}$ (which is different from the data volume level $VL_{N1}$ for the first orchard 614 and the second orchard 618).

Typically, $HC_{11}, HC_{12}, HC_{21}, HC_{22}, HC_{N1}$, and $HC_{N2}$ are all different but some or all may be the same. Similarly, $LV_{11}, LV_{12}, LV_{21}, LV_{22}, LV_{N1}$, and $LV_{N2}$ are all different but some or all may be the same.

Generally, a new orchard will be generated for a given query if the data volume level changes by a threshold amount, for example by 10 percent, or if a hardware component, such as a physical processor or a data storage facility, are added or removed from the hardware configuration. Other reasons for creating an orchard that represent differences in execution environment are within the scope of this disclosure.

The logged execution cost (actuals) for each plan instance is recorded where the definition of "cost" will be covered in the subsequent section on identifying regressions. Note that in the context of offline training, the logged timestamps of the plans in a given pair (i.e., older vs. newer) are not relevant because what makes a better plan is fundamentally based on other features.

Data volumes for tables referenced within a pair of plans can be compared by examining the optimizer's row estimates for leaf level plan operators that read from each base table or from system activity counters that track insert and load activity over a period of time such as Teradata's Object Use and UDI Counts feature [6,17]. Hardware configurations in effect for a pair of plans can be compared by examining the configured optimizer cost profile that was in effect when a given plan was generated.

Identifying Observed Regressions and Labeling Training Data

Pairs of executed plans grown from the same orchard are enumerated and have their costs compared to determine whether or not a significant performance difference exists and in turn is used to assign a binary label. Performance costs used in this comparison are in the form of actual observed costs, as opposed to optimizer estimates, as recorded in historical query logs [5], e.g. query plan logs $502_1, 502_2, \ldots, 502_n$. The specific cost metrics used are those that do not vary based on current system activity and load levels such as logical I/Os. Latencies (response times) are not considered as they can vary from factors other than plan regression. In addition, timestamps recording when query plans were executed (newer vs. older) are not considered as performance can fluctuate in both directions over time.

Plans whose performance differ by insignificant amounts are not labeled as a regression in order to focus learning on predicting meaningful regressions, where the "significant" in this context a percentage threshold. When labeling a pair as a regression, the left member designates that lower cost plan and the right member designates the offending higher cost plan, although it will be understood that different labeling may be used. FIG. 7 summarizes an example of predicting regression between a pair of plans with pseudo-code written in a C-language style syntax.

Feature Engineering of Pairs of Query Plans

The technique learns a binary classifier over pairs of query plans. The classifier takes an OldPlan 528 and a NewPlan 524 as inputs (see FIG. 5) and computes a feature vector describing the difference between two query plans. Alternatively, a pre-processor (not shown) may calculate the feature vector describing the difference between two query plans and submit that feature vector to the classifier. There are several ways to obtain such a difference vector; no particular technique is prescribed but some are described below. Although the Teradata SQL Engine [1] is used as the guide to documenting featurization methods, the ideas are applicable and extensible to other database engines that generate query plans as a set of interconnected physical step operators where intermediate results are passed between steps.

FIG. 8 illustrates featurizing a pair of plans. The technique first represents each query plan as a directed, attributed graph. Each node in the graph is a physical step operator. Each node is attributed with a critical subset of properties (attributes) and costs that are highly relevant to potential performance regressions, as discussed below in connection with FIG. 9. Edges describe the connections, and passing of intermediate results, between steps. After representing each of a pair of query plans as a graph, the technique obtains a vector describing the difference between the two graphs. There are several techniques that could be used to do this and any might be used. One possibility, described in [8], is to compute an aggregated property-wise difference between the operators of the plans. This can be enumerated into a fixed length vector, but it only indirectly captures the structural information of the plan via weighting operator attributes.

FIG. 9 summarizes the step level attributes that may be considered when building the model. For each step operator in a query plan, the Optimizer's estimated resource usage is recorded along with corresponding actuals (when available) which represent the amount of work that a step performs. The directed, attributed graph representation of a query plan thus describes the amount of work performed at each step along with the plan structure and relations between steps. This representation clearly encodes details such as the optimizer's chosen join order that affect plan efficiency.

Other approaches work directly with graph structures. One technique to convert trees to vectors is described in [13]. A graph autoencoding framework, such as described in [19], embeds graphs into a learned vector space that carries latent information about the connectivity and attributes of the graph nodes. When these techniques are used to produce graph-level embeddings, computing the difference between two plans is a matter of subtracting their embedding vectors. The same query plans that provide training data for the classifier could be used to train a graph autoencoder.

Offline Learning of Classifier

Offline learning will be performed on query logs [5], e.g., $502_1, 502_2, \ldots, 502_n$, captured from a wide variety of inhouse and customer databases and workloads and subsequently featurized as described in the prior section. The availability of customer query logs among database vendors is increasingly common as customer systems are often deployed within a vendor managed cloud environment along with techniques to anonymize any potentially identifiable information (PII) metadata within them [15].

The model will focus on learning a binary classifier to predict performance regression as opposed to predicting execution costs which has been problematic due to the huge diversity in queries, demographics, and the space of alternative plans [7]. The model will learn how to compare two query plans including their structure and performance related features and will focus on minimizing the error from comparing them.

Supervised learning is performed on the labeled and featurized data employing standard methods that operate on either vectors or graphs [9, 14] which in turn retain and leverage the rich relational structure of query plans.

Persistent Storage of Query Plans

The technique leverages established methods for retaining and re-using the execution plans for frequently executed queries. Almost all database engines have the ability to cache plans for frequently executed queries thereby avoiding the overhead of having to repeatedly parse and optimize them. Teradata's Request Cache [6] is one such example. As illustrated in FIG. 5, the interpreter, etc. 300, 305, 310, 315 identifies if a plan already exists in cache 532 by, for example, employing a hashing method on the request. If a plan already exists, it is fetched from cache and executed without invoking the query optimizer 320. Because cache sizes are limited and may not survive a database engine restart, some database systems extend the solution to include persistent storage, referred to herein as a "cache-like persistent storage," for a subset of selected plans within a "query store" [3] 530. The technique leverages such plan methods to retain OldPlans and apply a post-optimization quality check before deciding to replace a given OldPlan with a NewPlan.

The system automatically detects when a cached or stored plan becomes invalid due to certain physical design changes (e.g., index is dropped) and responds by spoiling the cache and dropping the stored plan. Even if plans remain valid, over time they will eventually become stale (sub-optimal) due to underlying changes in the data demographics or the availability of new index access paths. As such, systems generally offer a mechanism for the user to manually force a re-optimization if they feel that a new and better plan will likely result. In addition, methods have been proposed for a system to automatically detect when a stored plan is likely stale [4] by applying heuristics to certain events including the recollection of statistics, hardware configuration changes, or upgrading to new software releases.

An advantage of the technique described herein is its ability to work in harmony with such methods for caching and to store plans and not interfere with their logic for reusing plans or determining when to re-optimize them. Instead, the technique described herein is activated only when the system decides to re-optimize a given query that already has a valid plan in cache or storage. At that point, the technique applies an additional quality check before deciding whether the newly optimized plan should be chosen to replace the existing plan and executed.

Deploying Classifier with Online Query Optimization

The learned model is deployed as an API and integrated within a Database Engine as depicted in portion 5b of FIG. 5. Upon completing the standard query optimization phase, if the new plan picked by the optimizer is different than the current best plan that is cached and/or persistently stored, the API is called to predict whether or not the new plan would result in a performance regression. Because the newly proposed plan has not yet executed, the API must rely on optimizer estimates rather than logged actuals for the various resource usage metrics. The remaining features for the new plan, including its operator tree structure (join order) and step operator types, can be used in the same fashion as offline training.

In the event the new and current (old) plan reside in different orchards due to a recent change in hardware configuration or data volumes, the optimizer's chosen plan is assumed to be the best choice for the new orchard (baseline) that is now in effect for the system. For new queries where a cached or stored plan does not exist, then of course the optimizer's plan is also chosen.

In cases where a potential regression is predicted, the optimizer's current plan is discarded and recorded in an event log that serves as a learning feedback loop to the optimizer itself. During the next instance of optimizing the same query, the Optimizer is informed that its chosen plan was rejected and in turn it can make any necessary adjustments to its confidence levels for that plan and potentially avoid choosing it again.

FIG. 10 summarizes deploying the classifier API with query optimization and plan caching using C-language style pseudo-code calling an API named IsPlanRegression( ).

Adapting Offline Model for Localization

Although the offline model is trained on a variety of query workloads taken from a multi-tenant cloud environment, as shown in portion 5a of FIG. 5, in some scenarios it may not be accurate enough to predict regressions for a newly introduced local workload and its particular combination of plan features. The solution to such problems typically involves adapting the model or supplementing it with a separate locally trained model. By themselves, such local models often suffer from being overfitted on their narrowly defined set of training data.

The technique described herein provides the ability to conduct retraining during subsequent online phases including any testing phase that normally occurs prior to putting a new workload into production. When new workloads are first added, the ensuing testing and stabilization period that precedes going production allows capturing the logged plans into query plan log 540 (see FIG. 5) and retraining the model 542 to include the newly introduced queries. During this training period, the regression API check 522 is not used allowing the optimizer to solely dictate which plans get executed. The normal call to the classifier API is bypassed by issuing test queries with a designated Query Band which informs the system of this special testing mode.

Figure 11:
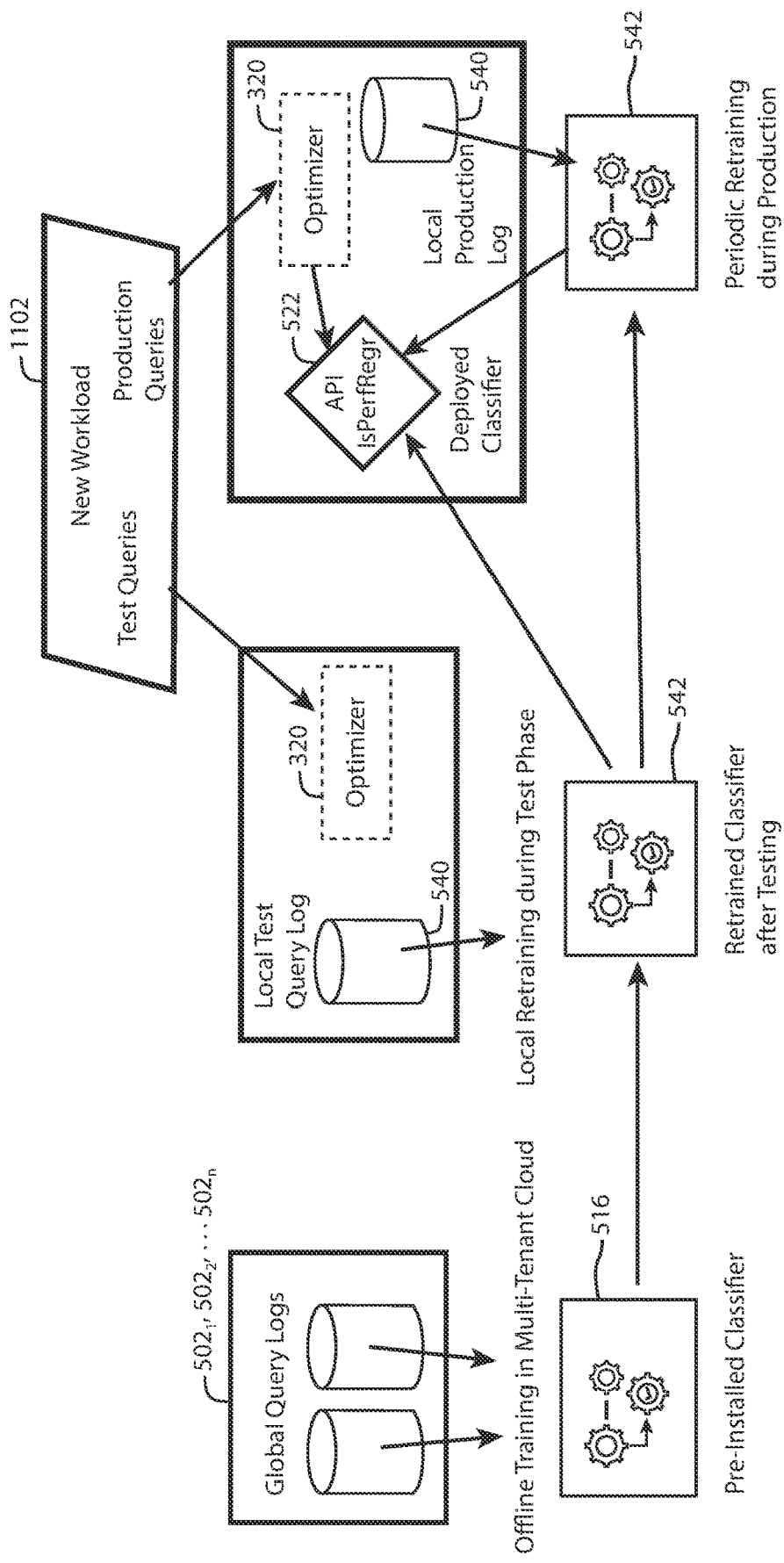
FIG. 11 illustrates retraining the classifier for new workloads.

Any optimizer mistakes and ensuing performance regressions that occur during the testing period are helpful in retraining the model to predict future occurrences. As depicted in FIG. 11, the technique retrains its model with newly added query logs and deploys the adapted model prior to going production. When necessary, the cost of the retraining can be absorbed by the database vendor or performed on a separate machine by exporting the query logs. FIG. 6 depicts this retraining.

During the production phase, the classifier API is deployed and called as a post-Optimization step to predict whether a regression would occur with the new plan as compared to any currently cached or stored plan. Although hopefully rare, there may be cases where the API does not predict a regression but the subsequent execution of the new plan does in fact result in an observed regression as recorded in the query log. Such cases provide ongoing opportunities to learn from Classifier mistakes via periodic retraining on the production query logs in a fashion similar to the prior testing phase and as depicted in FIG. 6.

Further examples consistent with the present teaching are set out in the following numbered clauses.

Clause 1. A method comprising:
a database system receiving a query;
the database system retrieving an old query execution plan (QEP), OldPlan, for the query;
the database system submitting the query to an optimizer;
the optimizer returning a new QEP, NewPlan, for the query;
the database system submitting the OldPlan and the NewPlan to a machine learning classifier (ML classifier);
the ML classifier predicting that executing the NewPlan will result in a performance regression as compared to executing the OldPlan; and
the database system executing the OldPlan instead of the NewPlan.

Clause 2. The method of clause 1 further comprising training the ML classifier by:
determining costs of historical QEPs for the query using logged resource usage metrics not impacted by extraneous system activities; and
comparing the determined costs of a pair of historical QEPs for the query and labeling a one of the pair as a regression if the determined cost of the one of the pair of historical QEPs exceeds the determined cost of the other of the pair of historical QEPs by a threshold percentage.

Clause 3. The method of clause 2 wherein the pair of historical QEPs is selected from an orchard of QEPs for the query wherein the orchard contains QEPs developed for the query for hardware configurations having the same complement of hardware processors and data storage facilities and for data volume levels within a threshold amount of each other.

Clause 4. The method of clause 3 further comprising:
the database system determining that, because of a recent change in hardware configuration or data storage facilities the NewPlan is in a different orchard than the OldPlan, and, as a result, not performing any of the elements of claim 1 except the database system receiving the query, the database submitting the query to the optimizer, and the optimizer returning the new QEP, NewPlan, for the query, further comprising:
the database system executing the NewPlan;
the database system including the NewPlan and statistics from executing the NewPlan in the logged resource usage metrics being used to train the ML classifier.

Clause 5. The method of any of clauses 2-4 further comprising the database system determining that the query is being run in a training mode, a retraining mode, or that a query plan exists for the query in a cache or a cache-like persistent storage, and, as a result, not performing any of the elements of claim 1 except the database system receiving the query, the database submitting the query to the optimizer, and the optimizer returning the new QEP, NewPlan, for the query, further comprising:
the database system executing the NewPlan; and
the database system including the NewPlan and statistics from executing the NewPlan in the logged resource usage metrics being used to train the ML classifier.

Clause 6. The method of any of clauses 2-5 wherein the database system determines that the query is being run in a retraining mode by the query being designated with a retraining query band.

Clause 7. The method of any of the preceding clauses further comprising:
the database system determining that the cache or cache-like persistent storage has become invalid dues to changes in a hardware configuration for the database system maintaining the cache or cache-like persistent storage, and as a result,
the database system spoiling the cache or cache-like persistent storage.

Clause 8. The method of any of clauses 4-7 further comprising replacing the OldPlan in a memory store with the NewPlan.

Clause 9. The method of any of the clauses 1-3 wherein the database system retrieves the OldPlan from a cache.

Clause 10. The method of any of clauses 1-3 and 9 further comprising notifying the optimizer that the NewPlan has been rejected.

Clause 11. The method of any of the preceding clauses wherein the ML classifier is encapsulated as an application programming interface (API) that can be called by the database system.

Clause 12. A non-transitory computer-readable tangible medium, on which is recorded a computer program, the computer program comprising executable instructions, that, when executed, perform a method comprising:
a database system receiving a query;
the database system retrieving an old query execution plan (QEP), OldPlan, for the query;
the database system submitting the query to an optimizer;
the optimizer returning a new QEP, NewPlan, for the query;
the database system submitting the OldPlan and the NewPlan to a machine learning classifier (ML classifier);
the ML classifier predicting that executing the NewPlan will result in a performance regression as compared to executing the OldPlan; and
the database system executing the OldPlan instead of the NewPlan.

Clause 13. The method of clause 12 further comprising training the ML classifier by:
determining costs of historical QEPs for the query using logged resource usage metrics not impacted by extraneous system activities; and
comparing the determined costs of a pair of historical QEPs for the query and labeling a one of the pair as a regression if the determined cost of the one of the pair of historical QEPs exceeds the determined cost of the other of the pair of historical QEPs by a threshold percentage.

Clause 14. The method of clause 13 wherein the pair of historical QEPs is selected from an orchard of QEPs for the query wherein the orchard contains QEPs developed for the query for hardware configurations having the same complement of hardware processors and data storage facilities and for data volume levels within a threshold amount of each other.

Clause 15. The method of clause 14 further comprising:
the database system determining that, because of a recent change in hardware configuration or data storage facilities the NewPlan is in a different orchard than the OldPlan, and, as a result, not performing any of the elements of claim 12 except the database system receiving the query, the database submitting the query to the optimizer, and the optimizer returning the new QEP, NewPlan, for the query, further comprising:
the database system executing the NewPlan; and
the database system including the NewPlan and statistics from executing the NewPlan in the logged resource usage metrics being used to train the ML classifier.

Clause 16. The method of any of clauses 13-15 further comprising the database system determining that the query is being run in a training mode, a retraining mode, or that a query plan exists for the query in a cache or a cache-like persistent storage, and, as a result, not performing any of the elements of claim 12 except the database system receiving the query, the database submitting the query to the optimizer, and the optimizer returning the new QEP, NewPlan, for the query, further comprising:
the database system executing the NewPlan; and
the database system including the NewPlan and statistics from executing the NewPlan in the logged resource usage metrics being used to train the ML classifier.

Clause 17. The method of any of clauses 13-16 wherein the database system determines that the query is being run in a retraining mode by the query being designated with a retraining query band.

Clause 18. The method of any of clauses 12-17 further comprising:
the database system determining that the cache or cache-like persistent storage has become invalid dues to changes in a hardware configuration for the database system maintaining the cache or cache-like persistent storage, and as a result,
the database system spoiling the cache or cache-like persistent storage.

Clause 19. The method of any of clauses 12-14 further comprising notifying the optimizer that the NewPlan has been rejected.

Clause 20. The method of any of clauses 12-19 wherein the ML classifier is encapsulated as an application programming interface (API) that can be called by the database system.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Teradata Vantage Advanced SQL Engine. https://www.teradata.com/Products/Software/Database
[2] Viktor Leis et al. How good are query optimizers, really? Proc. VLDB Endow., 2015.
[3] Monitoring performance by using the Query Store. Microsoft SQL Server 2019 User Documentation. https://docs.microsoft.com/en-us/sql/relational-databases/performance/monitoring-performance-by-using-the-query-store
[4] Louis Burger, et al. Selective Automatic Refreshing of Stored Execution Plans. U.S. Pat. No. 7,831,593 issued Nov. 9, 2010.
[5] Douglas P. Brown, et al. System and method for logging database queries. U.S. Pat. No. 7,127,456 issued Oct. 24, 2006.
[6] Teradata Vantage SQL Request and Transaction Processing. Teradata documentation #B035-1142-162K. docs.teradata.com
[7] Wentao Wu, Yun Chi, Shenghuo Zhu, Jun'ichi Tatemura, Hakan Hacigiimils, and Jeffrey F. Naughton. 2013. Predicting Query Execution Time: Are Optimizer Cost Models Really Unusable?. In ICDE. IEEE Computer Society, Washington, DC, USA, 1081-1092. https://doi.org/10.1109/ICDE.2013.6544899
[8] B. Ding, S. Das, R. Marcus, W. Wu, S. Chaudhuri, and V. R. Narasayya. Ai meets ai: Leveraging query executions to improve index recommendations. In Proceedings of the 2019 International Conference on Management of Data, pages 1241-1258, 2019.
[9] P. W. Battaglia, J. B. Hamrick, V. Bapst, A. Sanchez-Gonzalez, V. Zambaldi, M. Malinowski, A. Tacchetti, D. Raposo, A. Santoro, R. Faulkner et al., "Relational inductive biases, deep learning, and graph networks," arXiv preprint arXiv:1806.01261, 2018.
[10] Overview of SQL Plan Management. Oracle Release 12.2 User Documentation. https://docs.oracle.com/en/database/oracle/oracle-database/12.2/tgsql/overview-of-sql-plan-management.html
[11] Jennifer Ortiz, et al. An Empirical Analysis of Deep Learning for Cardinality Estimation. CoRR abs/1905.06425 (2019)
[12] Ryan Marcus et al. Neo: A Learned Query Optimizer. Proceedings of the VLDB Endowment July 2019. arXiv:1904.03711
[13] H. Zhang, S. Wang, X. Xu, T. W. S. Chow and Q. M. J. Wu, "Tree2Vector: Learning a Vectorial Representation for Tree-Structured Data," in IEEE Transactions on Neural Networks and Learning Systems, vol. 29, no. 11, pp. 5304-5318, Nov. 2018.
[14] Feng Xia, et al. Graph Learning: A Survey. IEEE Transactions On Artificial Intelligence, Vol. 00, No. 0, 2021. arXiv:2105.00696
[15] Silva, Paulo & Monteiro, Edmundo & Simoes, Paulo. (2021). Privacy in the Cloud: A Survey of Existing Solutions and Research Challenges. IEEE Access. PP. 1-1. 10.1109/ACCESS.2021.3049599.
[16] Douglas P. Brown, et al. Identifying Database Request Sources. U.S. Pat. No. 8,280,867 issued Oct. 2, 2012.
[17] Douglas P. Brown, et al. System, method, and computer-readable medium for grouping database level object access counts per processing module in a parallel processing system. U.S. Pat. No. 9,244,838 issued Jan. 26, 2016.
[18] Cabrera et al., Dynamically Learning Optimal Cost Profiles for Heterogenous Workloads. U.S. Patent Application Publication 2021/0117422, filed on Aug. 18, 2020.
[19] Thomas N. Kipf, and Max Welling. Variational graph auto-encoders. arXiv preprint arXiv:1611.07308 (2016).

What is claimed is:

1. A method comprising:
a database system receiving a query;
the database system retrieving an old query execution plan (QEP), OldPlan, for the query;
the database system submitting the query to an optimizer;
the optimizer returning a new QEP, NewPlan, for the query;
the database system submitting the OldPlan and the NewPlan to a machine learning classifier (ML classifier);
the ML classifier computing a feature vector describing a difference between:
an OldPlan graph of the OldPlan, wherein the OldPlan graph includes:
a plurality of OldPlan nodes, each associated with a physical step in the OldPlan, each OldPlan node including regression-relevant properties and costs previously determined to be relevant to performance regression, and
one or more OldPlan edges, each associated with a connection between OldPlan nodes, and
a NewPlan graph of the NewPlan, wherein the NewPlan graph includes:
a plurality of NewPlan nodes, each associated with a physical step in the NewPlan, each NewPlan node including the regression-relevant properties and costs, and
one or more NewPlan edges, each associated with a connection between NewPlan nodes;
the ML classifier predicting, based on the feature vector, that executing the NewPlan will result in a performance regression as compared to executing the OldPlan; and
the database system executing the OldPlan instead of the NewPlan.

2. The method of claim 1 further comprising training the ML classifier by:
determining costs of historical QEPs for the query using logged resource usage metrics not impacted by extraneous system activities; and
comparing the determined costs of a pair of historical QEPs for the query and labeling a one of the pair as a regression if the determined cost of the one of the pair of historical QEPs exceeds the determined cost of the other of the pair of historical QEPs by a threshold percentage.

3. The method of claim 2 wherein the pair of historical QEPs is selected from an orchard of QEPs for the query wherein the orchard contains QEPs developed for the query for hardware configurations having the same complement of hardware processors and data storage facilities and for data volume levels within a threshold amount of each other.

4. The method of claim 3 further comprising:
the database system determining that, because of a recent change in hardware configuration or data storage facilities the NewPlan is in a different orchard than the OldPlan, and, as a result, not performing any of the elements of claim 1 except the database system receiving the query, the database submitting the query to the optimizer, and the optimizer returning the new QEP, NewPlan, for the query, further comprising:
the database system executing the NewPlan;
the database system including the NewPlan and statistics from executing the NewPlan in the logged resource usage metrics being used to train the ML classifier.

5. The method of claim 2 further comprising the database system determining that the query is being run in a training mode, a retraining mode, or that a query plan exists for the query in a cache or a cache-like persistent storage, and, as a result, not performing any of the elements of claim 1 except the database system receiving the query, the database submitting the query to the optimizer, and the optimizer returning the new QEP, NewPlan, for the query, further comprising:
the database system executing the NewPlan; and
the database system including the NewPlan and statistics from executing the NewPlan in the logged resource usage metrics being used to train the ML classifier.

6. The method of claim 5 wherein the database system determines that the query is being run in a retraining mode by the query being designated with a retraining query band.

7. The method of claim 5 further comprising:
the database system determining that the cache or cache-like persistent storage has become invalid dues to changes in a hardware configuration for the database system maintaining the cache or cache-like persistent storage, and as a result,
the database system spoiling the cache or cache-like persistent storage.

8. The method of claim 5 further comprising replacing the OldPlan in a memory store with the NewPlan.

9. The method of claim 1 wherein the database system retrieves the OldPlan from a cache.

10. The method of claim 1 further comprising notifying the optimizer that the NewPlan has been rejected.

11. The method of claim 1 wherein the ML classifier is encapsulated as an application programming interface (API) that can be called by the database system.

12. A non-transitory computer-readable tangible medium, on which is recorded a computer program, the computer program comprising executable instructions, that, when executed, perform a method comprising:
a database system receiving a query;
the database system retrieving an old query execution plan (QEP), OldPlan, for the query;
the database system submitting the query to an optimizer;
the optimizer returning a new QEP, NewPlan, for the query;
the database system submitting the OldPlan and the NewPlan to a machine learning classifier (ML classifier);
the ML classifier computing a feature vector describing a difference between:
an OldPlan graph of the OldPlan, wherein the OldPlan graph includes:
a plurality of OldPlan nodes, each associated with a physical step in the OldPlan, each OldPlan node including regression-relevant properties and costs previously determined to be relevant to performance regression, and
one or more OldPlan edges, each associated with a connection between OldPlan nodes, and
a NewPlan graph of the NewPlan, wherein the NewPlan graph includes:
a plurality of NewPlan nodes, each associated with a physical step in the NewPlan, each NewPlan node including the regression-relevant properties and costs, and
one or more NewPlan edges, each associated with a connection between NewPlan nodes;
the ML classifier predicting, based on the feature vector, that executing the NewPlan will result in a performance regression as compared to executing the OldPlan; and
the database system executing the OldPlan instead of the NewPlan.

13. The method of claim 12 further comprising training the ML classifier by:
determining costs of historical QEPs for the query using logged resource usage metrics not impacted by extraneous system activities; and
comparing the determined costs of a pair of historical QEPs for the query and labeling a one of the pair as a regression if the determined cost of the one of the pair of historical QEPs exceeds the determined cost of the other of the pair of historical QEPs by a threshold percentage.

14. The method of claim 13 wherein the pair of historical QEPs is selected from an orchard of QEPs for the query wherein the orchard contains QEPs developed for the query for hardware configurations having the same complement of hardware processors and data storage facilities and for data volume levels within a threshold amount of each other.

15. The method of claim 14 further comprising:
the database system determining that, because of a recent change in hardware configuration or data storage facilities the NewPlan is in a different orchard than the OldPlan, and, as a result, not performing any of the elements of claim 12 except the database system receiving the query, the database submitting the query to the optimizer, and the optimizer returning the new QEP, NewPlan, for the query, further comprising: the database system executing the NewPlan; and
the database system including the NewPlan and statistics from executing the NewPlan in the logged resource usage metrics being used to train the ML classifier.

16. The method of claim 13 further comprising the database system determining that the query is being run in a training mode, a retraining mode, or that a query plan exists for the query in a cache or a cache-like persistent storage, and, as a result, not performing any of the elements of claim 12 except the database system receiving the query, the database submitting the query to the optimizer, and the optimizer returning the new QEP, NewPlan, for the query, further comprising:

the database system executing the NewPlan; and
the database system including the NewPlan and statistics from executing the NewPlan in the logged resource usage metrics being used to train the ML classifier.

17. The method of claim 16 wherein the database system determines that the query is being run in a retraining mode by the query being designated with a retraining query band.

18. The method of claim 16 further comprising:
the database system determining that the cache or cache-like persistent storage has become invalid dues to changes in a hardware configuration for the database system maintaining the cache or cache-like persistent storage, and as a result,
the database system spoiling the cache or cache-like persistent storage.

19. The method of claim 12 further comprising notifying the optimizer that the NewPlan has been rejected.

20. The method of claim 12 wherein the ML classifier is encapsulated as an application programming interface (API) that can be called by the database system.

\* \* \* \* \*